United States Patent
Hurley et al.

[11] Patent Number: 6,140,803
[45] Date of Patent: Oct. 31, 2000

[54] APPARATUS AND METHOD FOR SYNCHRONIZING A SYNCHRONOUS CONDENSER WITH A POWER GENERATION SYSTEM

[75] Inventors: Joseph David Hurley; Peter Jon Clayton, both of Casselberry, Fla.

[73] Assignee: Siemens Westinghouse Power Corporation, Orlando, Fla.

[21] Appl. No.: 09/291,411

[22] Filed: Apr. 13, 1999

[51] Int. Cl.[7] .................................................. H02P 9/04
[52] U.S. Cl. ................................. 322/29; 307/87
[58] Field of Search ................... 290/40 B; 322/29, 322/7, 8, 14, 15; 307/87, 43

[56] References Cited

U.S. PATENT DOCUMENTS

| | | | |
|---|---|---|---|
| 3,673,422 | 6/1972 | Parke | 307/87 |
| 3,772,526 | 11/1973 | Alwers | 290/38 |
| 3,794,846 | 2/1974 | Schlicher et al. | 307/87 |
| 4,031,407 | 6/1977 | Reed | 307/87 |
| 4,100,469 | 7/1978 | Nelson et al. | 318/227 |
| 4,249,088 | 2/1981 | Kleba et al. | 307/87 |
| 4,256,972 | 3/1981 | Wyatt et al. | 307/68 |
| 4,380,146 | 4/1983 | Yanone et al. | 60/39.141 |
| 4,418,307 | 11/1983 | Hoffmann et al. | 318/721 |
| 4,492,874 | 1/1985 | Near | 290/40 B |
| 4,656,413 | 4/1987 | Bourbeau | 322/47 |
| 4,714,869 | 12/1987 | Onitsuka | 322/20 |
| 5,422,518 | 6/1995 | Sashida | 307/75 |
| 5,642,006 | 6/1997 | Cech | 307/87 |
| 5,686,766 | 11/1997 | Tamechika | 307/43 |

*Primary Examiner*—Nick Ponomarenko

[57] ABSTRACT

A synchronous condenser (12) is synchronized with a power system (14) by modifying its rotational speed using a prime mover (18) while controlling the rate of change of rotational speed of the synchronous condenser (FIG. 1). With an open circuit breaker (16), the synchronous condenser (12) is brought to a rotational speed (44) close to a desired synchronizing speed (48). A clutch (20) operates between the prime mover (18) and the synchronous condenser (12) and disengages the prime mover (18) from operation once the synchronous condenser (12) is placed into operation with the power system (14). An excitation voltage is provided to the synchronization condenser (12) for providing an output voltage, which voltage is monitored. The rotational speed of the prime mover (18) is ramped at a desirable rate of change (46) for approaching an acceptable synchronizing speed (50). The rotor speed and system phase angles are monitored for bringing a desirable changing speed close to the synchronizing speed (48). By sensing a signal representative of the rate of change of rotational speed and filtering this sensed signal, a reliable acceleration signal is provided for use by an operator determining when to engage the synchronous condenser (12) with the power system (14). The breaker (16) is then closed when the speed of the synchronous condenser (12) is within the desired range of speeds (50), with a phase angle of the rotor appropriate for placing the synchronous condenser (12) in operation within the power system (14).

28 Claims, 3 Drawing Sheets

APPARATUS AND METHOD FOR SYNCHRONIZING A SYNCHRONOUS CONDENSER WITH A POWER GENERATION SYSTEM

FIELD OF THE INVENTION

The present invention relates to electric power plants and more particularly to an apparatus and method for synchronizing a synchronous condenser with an operating power system for providing reactive power to the power system.

BACKGROUND OF THE INVENTION

Electric power systems typically employ turbine generators to supply real power to the system grid in order to meet load demands of the system, and to supply reactive power to the system for supporting system voltage, thus enabling the power system to successfully provide electrical power. A turbine generator typically comprises a synchronous generator with its excitation system and a turbine to drive the synchronous generator. The driving power from the turbine allows the generator to transmit real power to the system, and the excitation system allows the synchronous generator to provide needed reactive power and voltage support.

As a power plant ages, high maintenance costs, lack of efficiency, or regulatory requirements may dictate that the turbine and its associated auxiliaries, such as boiler and reactor, be retired. In such case, the turbine, although still having a useful life, is no longer available to drive the generator, and the generator without a turbine to drive it will no longer be capable of supplying real power to the system. In these cases, traditionally, the entire plant, including the generator, has been retired or decommissioned. Because of the changing electric utility industry and the need for reactive power at critical locations in the power system, many power plant owners of retired power plants or equipment within the plant have considered decoupling the turbine from the generator and using the generator with its excitation system to supply reactive power as a synchronous condenser.

A synchronous condenser is a synchronous machine that delivers and absorbs reactive power to and from a transmission grid of a power system, but does not deliver real power to the grid during operation because it is typically not being driven by a prime mover such as a turbine. In order to synchronize the synchronous condenser to the transmission grid, it must first be driven to a rated speed by a prime mover, such as a turbine, electric motor, or torque converter, or by a starting package. Once the synchronous condenser has been synchronized to the grid, the prime mover or starting package is typically disconnected or de-energized. The use of synchronous machines is well known in the art, as illustrated by way of example with reference to U.S. Pat. No. 3,772,526 to Alwers directed to an apparatus for starting a gas turbine which is shaft coupled to a synchronous generator and bringing the turbine up to speed where it is able to supply sufficient torque to further accelerate the generator up to its synchronous speed for connection into a power system. Various methods have been disclosed for controlling rotational speed and phase of synchronous motors such as described in U.S. Pat. No. 4,418,307 to Hoffman et al. which senses the motion of poles with respect to the stator for providing sensor signals, which signals are then converted to sensor pulses and compared to a constant pulse for altering braking and accelerating moments. Further, it is well known to use synchronize a power plant generator with a power system by simply bring operating equipment up to a desired or rated speed, as described with reference to U.S. Pat. No. 4,031,407 to Reed.

However, a problem associated with driving the synchronous condenser to a rated speed and synchronizing the condenser to the grid includes controlling the prime mover or starting package. Typically, controllability of a prime mover, such as a torque converter, is quite coarse, while requirements for synchronization to the grid may be quite fine and require precision performance. By way of example, if one is attempting to synchronize an 1800 rpm synchronous machine to a grid in order to operate it as a synchronous condenser, its speed must typically be within ±1 rpm of the rated 1800 rpm in order to achieve a successful synchronization. However, the starting package which is used to drive the synchronous machine to the rated speed and then attempt to hold the machine near that rated speed in order to connect to the grid may nor be capable of holding the machine speed at the rated speed (e.g. 1800 rpm) or even within an acceptable range (e.g. ±1 rpm or ±2 rpm). As a result, synchronization may not be achievable by waiting until the speed of the starting package levels off to some steady state speed, because that steady state speed may be too far away from the rated speed to have a successful synchronization. By way of further example, if a starting package speed controller attempts to compensate for this error in speed by adjusting output torque of the prime mover, the change may be such that the speed stabilizes at some arbitrary higher or lower value to the rated speed, but still too far away from the rated, desirable, speed for synchronization. Continued attempts add costly operating expenses including valuable time for synchronizing. Further, any change in torque will typically take time to affect the speed due to a typically large rotor inertia being driven. The monitoring of rotor speed, as is typical in the art, involves a long delay time for any change in the starting package. Therefore, monitoring and controlling the speed will require a long time for any change in the starting package to affect a change in speed. It is desirable that the synchronization conditions be satisfied accurately and reliably, even with prime movers such as torque converters which typically have a coarse level of speed control. The present invention seeks to solve this unacceptable, yet to date tolerated problem.

SUMMARY OF THE INVENTION

In view of the foregoing background, it is therefore an object of the present invention to provide an apparatus and associated method for monitoring and controlling the rotational speed of a synchronous machine during operation and engaging with a power system grid. It is further an object of the invention to monitor the rate of change of rotational speed of a synchronous machine for providing an effective and efficient control thereto for engaging the synchronous condenser with a power system.

These and other objects, features and advantages according to the present invention are provided by an apparatus for synchronizing and electrically connecting a synchronous machine to a power system. The apparatus comprising a synchronous machine, herein described by way of example using a synchronous condenser, for providing reactive power to a power system and a prime mover operable with the synchronous machine for providing a rotational speed to the synchronous machine. A rotor speed sensor is used for sensing the rotational speed of the synchronous machine, which speed is monitored for providing a rate of change of speed at which the synchronous machine is operating. In one preferred embodiment of the invention, a clutch is operable between the prime mover and the synchronous machine for transferring the rotational speed of the prime mover to the synchronous machine. The clutch is operable from an engaged position for driving the synchronous machine to a disengaged position for removing the prime mover from operation with the synchronous machine. In a preferred embodiment, a processor receives a speed signal from the speed sensor and modifies a frequency response of the speed signal for providing a modified speed signal useful in providing the rate of change of speed.

In a method aspect of the present invention useful for synchronizing a synchronous machine to a power system, the method comprises the steps of monitoring a rate of change in the rotational speed of a rotor of the synchronous machine, modifying the rate of change of rotational speed to a desired rate of change for timely approaching a synchronizing speed, and electrically connecting the synchronous machine to a power system when the speed of the synchronous machine is within a desired range of speeds. The rotational speed of a synchronous machine is advanced, either accelerated or decelerated, toward a desired synchronizing speed useful with the power system. By bringing the changing speed, changing at a desired rate of change of speed, into the desired range of speeds that are proximate the synchronizing speed, the synchronous machine can be connected to the power system when the phase angle of the rotor is acceptably close to or at the power system phase angle.

BRIEF DESCRIPTION OF THE DRAWINGS

A preferred embodiment of the present invention as well as others that will become more apparent by referring to the following detailed description and drawings in which.

DETAILED DESCRIPTION OF PREFERRED EMBODIMENTS

The present invention will now be described more fully with reference to the accompanying drawings in which preferred embodiments of the invention are shown and described. It is to be understood that the invention may be embodied in many different forms and should not be construed as limited to the illustrated embodiments set forth herein. Rather, the applicant provides these embodiments so that this disclosure will be thorough and complete, and will convey the scope of the invention to those skilled in the art. Like numbers refer to like elements there through.

Figure 1:
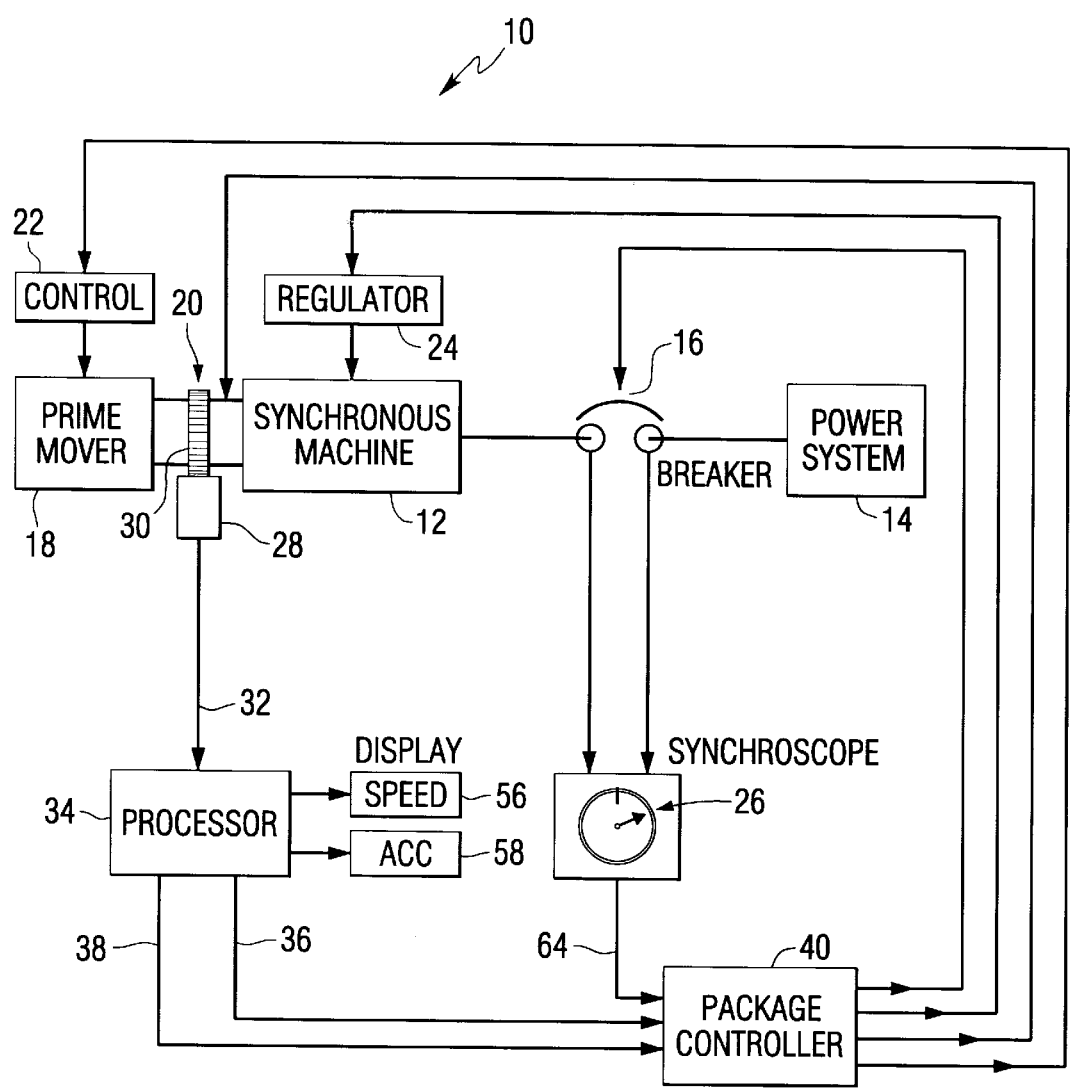
FIG. 1 is a block diagram illustrating an apparatus for synchronizing and electrically connecting a synchronous condenser to a power system for one preferred embodiment of the present invention.

With reference initially to FIG. 1, one preferred embodiment of the present invention, an apparatus 10 for synchronizing and electrically connecting a synchronous condenser 12 to a power system 14 such as a transmission grid, is herein described. The apparatus 10 comprises the synchronous condenser 12, a synchronous machine, operable with the power system 14 either directly or through a transformer and an electrical circuit breaker 16. A prime mover 18 drives the synchronous condenser 12 using a clutch 20 operable with the prime mover and the synchronous condenser for providing a rotational speed to the synchronous condenser. The clutch 20 is operable from an engaged position for driving the synchronous condenser 12 to a disengaged position for removing the prime mover 18 from operation with the synchronous condenser once a synchronizing connection of the condenser to the power system 14 has been accomplished. A speed controller 22 operates with the prime mover 18 for modifying the rate of change of rotational speed of the prime mover and thus the speed of the synchronous condenser 40. A fluid torque converter provides an economical prime mover and can be effectively used with the present invention. Other prime movers will include motors and turbines when circumstances warrant.

A voltage regulator 24 is used to apply an excitation voltage to the synchronous condenser 12 for providing an output voltage. The output voltage is monitored for providing signals indicative of magnitude, frequency, and phase angle. A synchroscope 26 is connected between the condenser 12 and power system 14 for comparing a power system phase angle to a synchronous condenser phase angle.

In the apparatus 10 herein described by way of example, a sensor 28 operates with a rotor gear 30 driven with the prime mover 18 for monitoring the rotation of the synchronous condenser rotor. The embodiment herein described includes a frequency transducer, by way of example, which counts gear teeth within a time period. Other rotational speed indicating means are appropriate, such as a tachometer. The sensor 28 provides a signal 32 indicative of a rotational speed to a processor 34 which is operable with the sensor for receiving the speed signal 32 and determining a rotational speed as well as a rate of change in the speed of the synchronous condenser rotor. The processor 34 include filters the signal 32 and modifies its frequency response for providing a modified speed signal 36 useful in providing the rate of change of speed of the synchronous condenser rotor. In a preferred embodiment of the present invention, low frequency bandpass styled filter is used. The rate sensing function with filter provides the combination differentiation of the speed signal and a filtering of the differentiated signal. By way of example, if the modified speed signal is represented by sT/(1+sT), sT being a function that determines the rate of change of speed, a preferred filter time constant (T) of the rate sensing function will be of the order of one to two seconds, such that it filters out unwanted noise, yet is sufficiently responsive to fast changes in acceleration rates found in the operation of a synchronous condenser. It is expected that alternate time constants will be employed to accommodate alternate uses without deviating from the intent and teachings of the present invention. Further, it is to be understood that either an analog, digital, or a combination electronic techniques can be used without deviating from the intent and teachings of the present invention. The speed signal 36, and an acceleration signal 38 are used to provide an indication of the speed and rate of change of speed for the synchronous condenser, for a manual use by an operator or for an automatic control use by a startup package controller 40.

Figure 2:
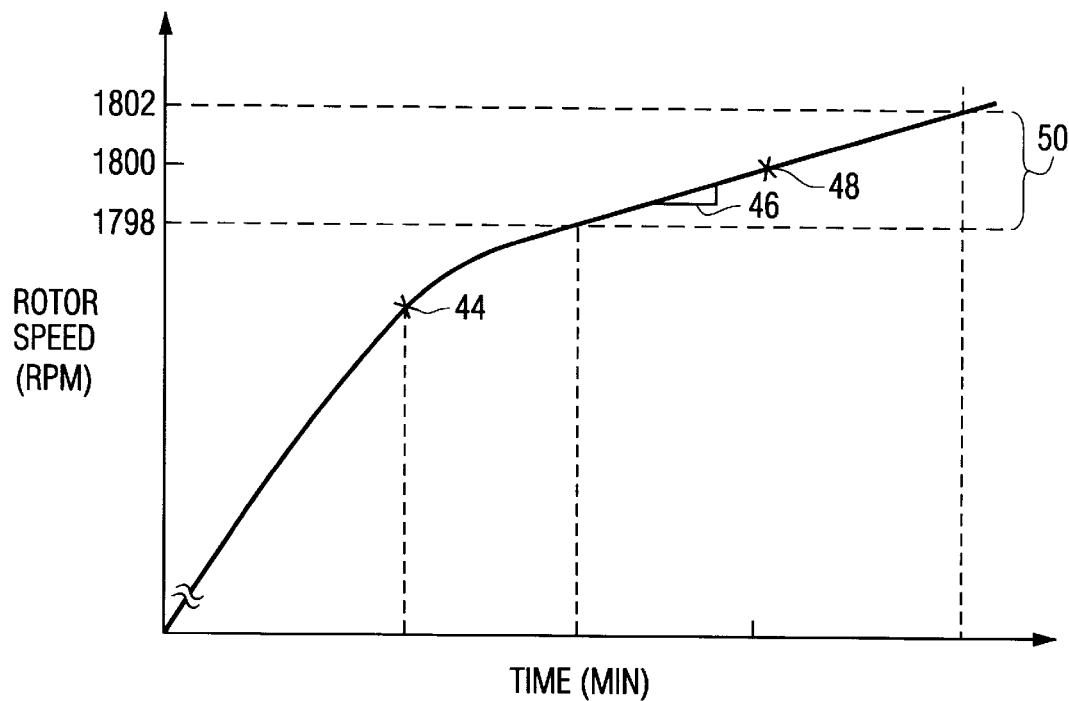
FIG. 2 is a plot of rotor speed versus time illustrating varying increasing speeds during a synchronizing procedure.

In operation, a method of electrically connecting the synchronous condenser 12 to the power system 14, in one preferred embodiment, will include operating the prime mover 18 for modifying the rate of speed of the synchronous condenser 12 while the breaker 16 is in an open position and therefore electrically disconnected from the power system 14. As illustrated with reference to FIG. 2, the synchronous condenser 12 is first quickly brought to a speed 44 for applying an excitation voltage to the synchronization condenser. The output voltage is monitored as earlier described. The rate of change of speed is then modified to a desirable ramping rate 46 while the synchroscope 26 is monitored during the changing speed of the prime mover 18 for advancing the speed of the synchronous condenser 12 toward a synchronizing speed 48. The rate of change in the speed is also monitored as earlier described with reference to FIG. 1. The rate of change of speed is adjusted to the desired rate of change of speed, desirable ramping rate 46 for timely approaching the synchronizing speed 48. By bringing the changing speed into a desirable range of speeds proximate the synchronizing speed 48, the breaker 16 is closed when the speed of the synchronous condenser is within the desired range of speeds and at desirable phase angles for placing the synchronous condenser in operation within the power system.

Figure 3:
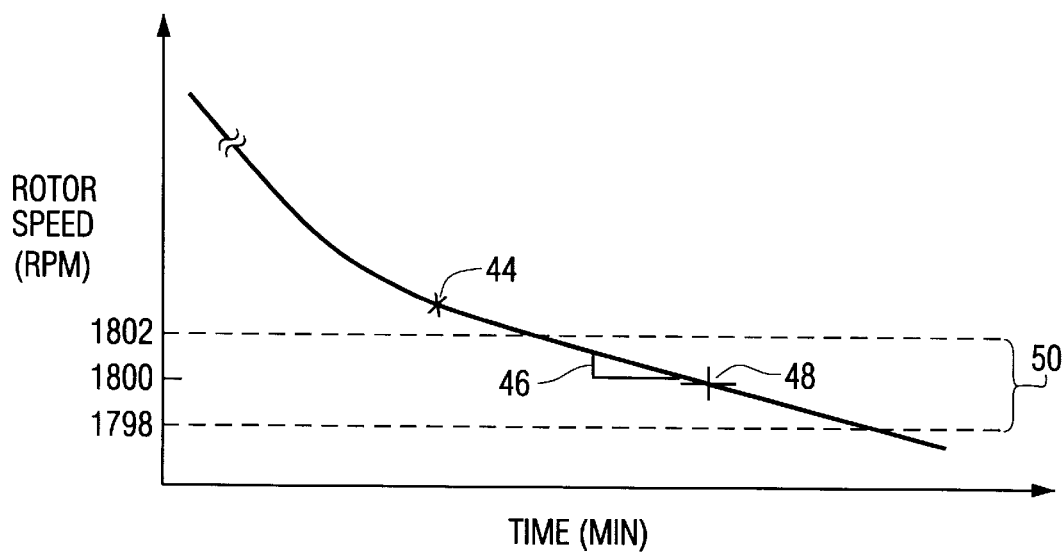
FIG. 3 is a plot of rotor speed versus time illustrating varying decreasing speeds during a synchronizing procedure.

As illustrated with reference to FIG. 3, the synchronizing of the synchronous condenser 12 with the power system 14 can be accomplished during deceleration as well as acceleration of the synchronous condenser. The above apparatus 10 and methods of the present invention equally apply. By way of example, testing has shown that one preferred ramping will include a rate of change of speed within approximately ±2 rpm/min. Further, as described by way of example with reference to FIGS. 2 and 3, one typically desired speed is 1800 rpm, for which the desirable range has proven to be 1800 rpm ±1 rpm. For a synchronizing speed of 3600 rpm, the desirable range is 3600 rpm±2 rpm. After a desired speed and phase angle are achieved for the synchronizing condenser and it has successfully connected with the power system, the prime mover is disengaged from the synchronous condenser and shut down.

Figure 4:
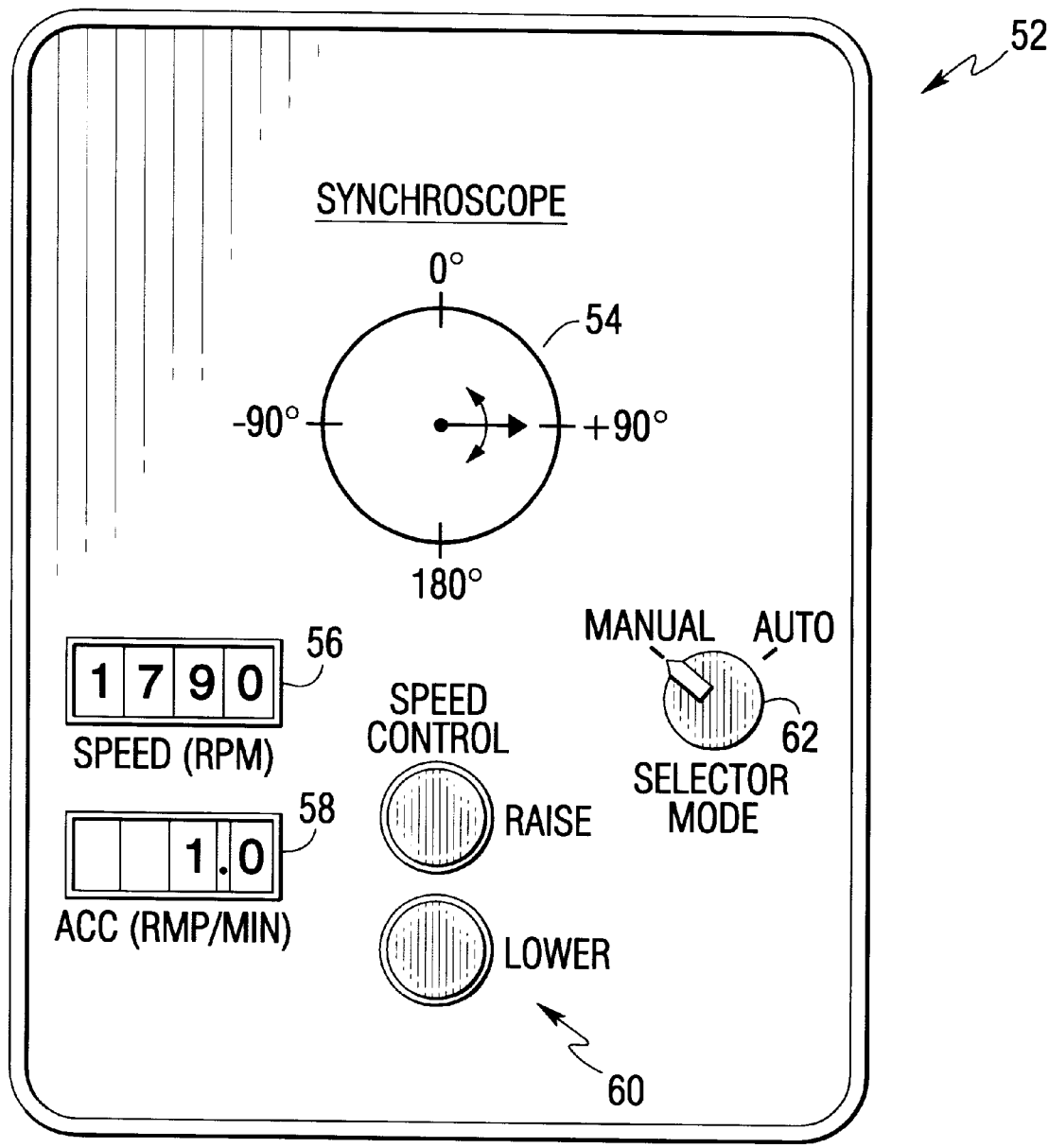
FIG. 4 is a partial plan view illustrating one embodiment of a control panel.

In operation, and by way of example, consider an operator in a power plant sitting at the control station and facing a control panel 52 as illustrated with reference to FIG. 4, which control panel provides a comparison 54 of the rotor phase angle and the power system phase angle, via a display from the synchroscope 26, a speed display 56, an acceleration display 58, and a speed control switch 60 for raising and lowering the speed of the prime mover. During a synchronizing procedure of the synchronous condenser 12 with the power system 14, as earlier described, the operator may encounter the following conditions:

The synchroscope is showing a +90° C. phase angle comparison between the rotor and the power system. The control panel shows the following:

| Case | Phase Angle Change | Rotor Speed | Acceleration |
| --- | --- | --- | --- |
| 1 | +1 rev in 2 sec | 1785 rpm | 1.0 rpm/min |
| 2 | +1 rev in 2 sec | 1785 rpm | 10.0 rpm/min |
| 3 | −1 rev in 15 sec | 1798 rpm | 10.0 rpm/min |
| 4 | +1 rev in 30 sec | 1799 rpm | 1.0 rpm/min |
| 5 | +1 rev in 2 sec | 1815 rpm | −1.0 rpm/min |
| 6 | +1 rev in 2 sec | 1815 rpm | −10.0 rpm/min |
| 7 | +1 rev in 15 sec | 1802 rpm | −10.0 rpm/min |
| 8 | +1 rev in 15 sec | 1801 rpm | −1.0 rpm/min |

Consider cases where speeds are below the desired speed for synchronizing.

For Case 1, if the operator continues on the course described, rotor speed will require 15 minutes to reach the desirable speed of 1800 rpm, too long a time period. Therefore, the operator would likely increase the acceleration rate of the rotor by using the push button styled speed control switch to raise the speed. For Case 2, rotor speed will require 1.5 minutes to reach 1800 rpm. This is acceptable and the operator would maintain the acceleration rate until the speed nears 1800 rpm. For Case 3, if the operator continues on the course described, rotor speed will pass through 1800 rpm before the synchroscope reaches 0°, too quickly. Therefore, the operator would likely decrease the acceleration rate of the rotor by using the push button styled speed control switch to lower the speed. For Case 4, if the operator continues on the course described, rotor speed will take one minutes to pass through 1800 rpm. This will allow the synchroscope to reach 0° at a slow rate, which slow rate is desirable. With such a desirable rate, conditions are satisfactory for synchronizing when the synchroscope reaches 0°.

It may be desirable to approach the synchronizing speed from rotor speeds that are greater than the synchronizing speed. For Case 5 described above, if the operator continues on the course described, rotor speed will require 15 minutes to reach the desirable speed of 1800 rpm, too long a time period. Therefore, the operator would likely increase the deceleration of the rotor by using the push button styled speed control switch to lower the speed. For Case 6, rotor speed will require 1.5 minutes to reach 1800 rpm. This is acceptable and the operator would maintain the deceleration until the speed nears 1800 rpm. For Case 7, if continued, rotor speed will pass through 1800 rpm before the synchroscope reaches 0°, too fast. Therefore, the operator would decrease the deceleration of the rotor by using the push button styled speed control switch to raise the speed. For Case 8, if continued, rotor speed will take one minutes to pass through 1800 rpm. This will allow the synchroscope to reach 0° during a desirable slow rate. With such a desirable rate, conditions are satisfactory for synchronizing when the synchroscope reaches 0°.

By way of example, a manual startup procedure was herein above described for a clear understanding of the present invention. The operator may choose to have an automatic synchronizing and select auto on the control panel switch 62. As illustrated again with reference to FIG. 1, in an alternate embodiment of the present invention, the controller 40 receives the speed signal 36, representative of rotor rotational speed of the synchronous condenser, the rate of change of speed, acceleration signal 38, and a phase angle comparative signal 64 from the synchroscope 26, and actuates the speed controller 22, the regulator 24, the breaker 16, and the clutch 20 as appropriate to effect a successful synchronizing connection of the synchronous condenser with the power system.

In summary, the present invention ramps the speed through the desired speed at an acceptable ramp rate. The acceptable ramp rate is a rate of change in speed that will assure a synchronization as the speed is slowly ramped through the desired synchronizing speed (1800 rpm by way of example 0. Testing has shown that the speed can be run through 1800 rpm at a ramp rate within ±2 rpm/min and product a successful synchronization, even if the final speed does not settle out at a steady state value near 1800 rpm. In order for the operator, in a manual synchronization procedure, or control circuit, in an automatic procedure, controlling how fast the existing speed approaches the desired speed any instant in time with only knowledge of the speed makes it difficult, as well as time and cost prohibitive, to determine go through the synchronizing procedure, especially with the coarse operation of a fluid torque converter as the prime mover. The present invention, provides the additional use of an acceleration which, as above described, provides an effective synchronizing procedure.

Use of an acceleration rate provides benefits to the operator or speed controller prior to synchronization. By way of further example, a starting package may provide a torque output. Any change in torque will take time to affect the rotor speed due to the large rotor inertia being driven. Therefore, speed indication or speed control alone would require a long time for any change in the starting package torque to evaluate the effect on the change speed. However, since a change starting package torque results in an immediate change in acceleration rate of the rotor, then an indication of control of acceleration rate will provide an immediate indication of effect of the starting package torque that was made. Further, if the speed is far away from synchronous speed and the acceleration rate is small, then it will tell the operator or speed controller to adjust the starting package output in order to increase the acceleration (or deceleration) rate to bring the speed more quickly to synchronous speed. If the speed is very near synchronous speed in acceleration (or deceleration) rate is large, then it will tell the operator or speed controller to adjust the starting package output to decrease the acceleration (or deceleration) rate to bring the speed to a slower ramp rate as the speed is ramping through synchronous speed, so as to enable a successful synchronization.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and alternate embodiments are intended to be included within the scope of the appended claims.

That which is claimed is:

1. A method for operating a synchronous machine with a power system, which synchronous machine is driven by a prime mover and is operable with the power system through an electrical breaker, the method comprising the steps of:

placing the breaker in an open condition;

driving the prime mover for modifying the rate of change of rotational speed of the synchronous machine to a first rotational speed;

changing the speed of the prime mover for advancing the speed of the synchronous machine toward a synchronizing speed useful with the power system;

monitoring a rate of change in the speed of the synchronous machine;

adjusting the rate of change of speed to a desired rate of change of speed for timely approaching the synchronizing speed;

bringing the changing speed into a range of speeds proximate the synchronizing speed; and closing the breaker when the speed of the synchronous machine is within the desired range of speeds for placing the synchronous machine in operation within the power system.

2. The method according to claim 1, further comprising the steps of:

applying an excitation voltage to the synchronization machine for providing an output voltage;

monitoring magnitude, frequency, and phase angle of the output voltage of the synchronous machine; and comparing the output voltage to a power system voltage.

3. The method according to claim 1, wherein the step of modifying the rate of change of speed comprises the steps:

starting the prime mover; and increasing the speed of the prime mover for increasing the speed of the synchronous machine.

4. The method according to claim 1, wherein the step of modifying the rate of change of speed comprises the step of decreasing the speed of the prime mover for decreasing the speed of the synchronous machine.

5. The method according to claim 1, further comprising the step of engaging a clutch carried between the prime mover and synchronous machine for driving the rotational speed of the synchronous machine.

6. The method according to claim 1, wherein the rate of change of speed adjusting step comprises the step of ramping the speed of the synchronous machine toward the desired speed at a rate of change of speed proximate a range of ±2 rpm/min.

7. The method according to claim 1, further comprising the steps of:

disengaging the prime mover from the synchronous machine; and shutting down the prime mover.

8. The method according to claim 1, wherein the rate of change of speed monitoring step comprises the steps of:

monitoring the rotational speed of the prime mover;

monitoring the rate of change of rotational speed of the prime mover for providing an acceleration signal representative of the rate of change of speed;

filtering the acceleration signal for providing an indication of rotational acceleration of the prime mover, and thus the synchronous machine.

9. A method for electrically connecting a synchronous machine to a power system, the method comprising the steps of:

modifying a rotational speed of a synchronous machine for advancing the speed toward a synchronizing speed useful with the power system;

monitoring a rate of change in the speed of the synchronous machine;

adjusting the rate of change of speed to a desired rate of change for timely approaching the synchronizing speed;

bringing the changing speed, changing at the desired rate of change of speed, into a range of speeds proximate the synchronizing speed; and electrically connecting the synchronous machine to the system when the speed of the synchronous machine is within the desired range of speeds for thus placing the synchronous machine in operation within the power system.

10. The method according to claim 9, further comprising the steps of:

applying an excitation voltage to the synchronization machine for providing an output voltage;

monitoring magnitude, frequency, and phase angle of the output voltage of the synchronous machine; and comparing the output voltage to a power system voltage.

11. The method according to claim 9, wherein the speed modifying step comprises the steps:

driving the synchronous machine with a prime mover mechanically connected thereto; and modifying the prime mover speed for modifying the speed of the synchronous machine.

12. The method according to claim 11, further comprising the step of engaging a clutch carried between the prime mover and synchronous machine for driving the rotational speed of the synchronous machine.

13. The method according to claim 11, further comprising the steps of:

disengaging the prime mover from the synchronous machine; and shutting down the prime mover.

14. A method for synchronizing a synchronous machine to a power system, the method comprising the steps of:

monitoring a rate of change in rotational speed of a synchronous machine;

modifying the rate of change of rotational speed to a desired rate of change for timely approaching a synchronizing speed; and electrically connecting the synchronous machine to a power system when the speed of the synchronous machine is within a desired range of speeds.

15. The method according to claim 14, further comprising the steps of:

modifying the rotational speed of a synchronous machine for advancing the speed toward the synchronizing speed useful with the power system;

bringing the changing speed, changing at the desired rate of change of speed, into the desired range of speeds, which speeds are proximate the synchronizing speed and useful for placing the synchronizing machine in operation with the power system.

16. The method according to claim 15, wherein the speed modifying step comprises the steps:

driving the synchronous machine with a prime mover mechanically connected thereto; and modifying the prime mover speed for modifying the speed of the synchronous machine.

17. The method according to claim 16, further comprising the step of disengaging the prime mover from the synchronous machine.

18. The method according to claim 14, further comprising the steps of:

applying an excitation voltage to the synchronization machine for providing an output voltage;

monitoring magnitude, frequency, and phase angle of the output voltage of the synchronous machine; and comparing the output voltage to a power system voltage.

19. An apparatus for synchronizing and electrically connecting a synchronous machine to a power system, the apparatus comprising:

a synchronous machine for providing reactive power to a power system;

a prime mover operable with the synchronous machine for providing a rotational speed to the synchronous machine;

speed sensing means for sensing the rotational speed of the synchronous machine; and processing means operable with the speed sensing means for providing a rate of change of speed at which the synchronous machine is operating.

20. The apparatus according to claim 19, further comprising a clutch operable between the prime mover and the synchronous machine for transferring the rotational speed of the prime mover to the synchronous machine, the clutch operable from an engaged position for driving the synchronous machine to a disengaged position for removing the prime mover from operation with the synchronous machine.

21. The apparatus according to claim 19, wherein the processing means comprises an electrical filter for receiving a signal indicative of the speed and modifying a frequency response of the speed signal for providing a modified speed signal useful in providing the rate of change of speed.

22. The apparatus according to claim 21, wherein the filter comprises a low frequency bandpass styled filter.

23. The apparatus according to claim 21, wherein the filter is an analog filter.

24. The apparatus according to claim 19, wherein the prime mover is selected from the group consisting of a torque converter, motor, and a turbine.

25. The apparatus according to claim 19, further comprising voltage monitoring means for providing a signal indicative of magnitude, frequency, and phase angle of the output voltage of the synchronous machine.

26. The apparatus according to claim 19, further comprising voltage means operable with the synchronous machine for providing an excitation voltage thereto.

27. The apparatus according to claim 26, further comprising a synchroscope operable between the synchronous machine and the power system for comparing a power system phase angle to a synchronous machine phase angle.

28. The apparatus according to claim 19, wherein the synchronous machine comprises a synchronous condenser.

* * * * *